(12) United States Patent
Morford

(10) Patent No.: US 6,402,692 B1
(45) Date of Patent: Jun. 11, 2002

(54) APPARATUS AND METHOD FOR DETECTING AND STORING INFORMATION RELATING TO AN ANIMAL

(75) Inventor: Chris L. Morford, Eagle, ID (US)

(73) Assignee: Hewlett-Packard Co., Palo Alto, CA (US)

(*) Notice: Subject to any disclaimer, the term of this patent is extended or adjusted under 35 U.S.C. 154(b) by 31 days.

(21) Appl. No.: 09/666,005

(22) Filed: Sep. 19, 2000

(51) Int. Cl.⁷ ................................................ A61B 5/00
(52) U.S. Cl. ....................... 600/301; 128/903; 128/897; 369/100; 365/151
(58) Field of Search ................................. 600/300–301, 600/309, 481; 128/903, 904, 920–925; 705/2–3, 9; 365/52, 63, 151; 369/100, 101

(56) References Cited

U.S. PATENT DOCUMENTS

| 5,458,123 A | 10/1995 | Unger |
| 5,557,596 A | 9/1996 | Gibson et al. |
| 5,650,945 A | 7/1997 | Kita |
| 5,749,365 A | 5/1998 | Magill |
| 5,768,127 A | 6/1998 | Murata |
| 5,807,267 A | 9/1998 | Bryars et al. |
| 5,952,959 A | 9/1999 | Norris |
| 5,964,701 A | 10/1999 | Asada et al. |
| 6,113,539 A | * 9/2000 | Ridenour ..................... 600/300 |
| 6,310,794 B1 | * 10/2001 | Carter .......................... 365/52 |

* cited by examiner

Primary Examiner—Kevin Shaver
Assistant Examiner—Michael C Astorino

(57) ABSTRACT

An apparatus for and method of detecting, storing, and retrieving information relating to an animal over a period of time is disclosed. The method includes electrically coupling an atomic resolution storage device to a detecting device within a single unit. The single unit is attached to an animal, such as a mammal or a fish. At least one monitored parameter, such as a location of the animal, a heart rate of the animal, a blood flow rate of the animal, or a temperature of the animal, is stored in the storage device over a period of time. The information stored within the storage device is retrieved from the single device after a period of time.

26 Claims, 6 Drawing Sheets

APPARATUS AND METHOD FOR DETECTING AND STORING INFORMATION RELATING TO AN ANIMAL

THE FIELD OF THE INVENTION

The present invention relates generally to storing and retrieving a large amount of information, and more particularly to detecting, storing, and retrieving information relating to at least one parameter of an animal over a period of time.

BACKGROUND OF THE INVENTION

Since the beginning of time, animals have migrated between various locations or have roamed about the land, either in unrecognizable patterns or in response to environmental conditions. For example, various types of fish migrate from their home location to another location, often upstream, or against the current of an ocean or another body of water, in order to reproduce. Similarly, various types of birds migrate between locations depending upon the environmental conditions, wherein the locations are often thousands of miles apart from each other.

Some animals, such as bears, deer, moose, elk, and the like, roam about the land in unrecognizable patterns. Other animals migrate about the land due to environmental conditions, such as fires or temperature variations. Yet other animals migrate from location to location due to survival instincts and the threat of larger or more aggressive animals endangering their safety.

Researchers and scientists have attempted to maintain a record of the migratory habits of various animals. For example, particular animals of a species are often identified and tagged. The tags are often attached to a body part of an animal, such as a wing or a limb, in hope that the migratory pattern of the animal can be followed by periodic identification of the animal via the tag. However, in some cases, the time period between identifications of a particular animal may be months, or even years. Thus, a true and complete migratory pattern is not known. Rather, the location of the particular animal at sporadic time periods is known. In the majority of cases, once an animal has been tagged, the animal is never observed again, and therefore, no information or knowledge is gained.

In addition to tracking the migratory pattern of animals, it is also desirous to track physical characteristics of animals over a period of time. For example, the knowledge of the heart rate, temperature, and blood flow rate of an animal over a period of time would provide previously unknown information which would aide in the understanding of the animal. There are no conventional means of detecting, storing, and/or retrieving this type of information.

Therefore, there is a need for a method and device capable of detecting and accurately storing information and data relating to an animal, such as physical location and physical characteristics, over a period of time. The device must be relatively small and lightweight such that it will encumber movement of the animal. The device must also be capable of storing a large amount of data or information relating to the animal such that the information to be stored may encompass various characteristics over a significant period of time.

SUMMARY OF THE INVENTION

The present invention is an apparatus for detecting and storing information or data relating to an animal and a method of monitoring information relating to parameters of an animal. The apparatus includes at least one detection component capable of detecting information regarding at least one parameter of the animal. An atomic resolution storage device is electrically coupled to the detection component for storing the information regarding the detected parameter.

In one embodiment, the detection component further includes a clocking device, such as a real time clock, electrically coupled to the storage device such that data relating to a parameter of the animal can be stored in real time. In another embodiment, the detection component is a receiver associated with a global positioning system which is electrically coupled to the storage device such that the storage device stores information relating to a location of the animal in real time. In still another embodiment, the detection component is a heart monitoring device capable of monitoring a parameter of the heart of the animal, a blood flow monitoring device capable of monitoring the blood flow within the animal, or a temperature sensor capable of sensing a temperature of the animal.

In still yet another embodiment, the apparatus includes a microprocessor electrically coupled to the detection component and the storage device. The microprocessor is capable of manipulating the information regarding the detected parameter and providing data to the storage device based upon the manipulated information.

The method of monitoring information relating to a parameter of an animal includes the step of electrically coupling an atomic resolution storage device to a detecting device within a single unit. The single unit is attached to an animal. Information relating to at least one detected parameter of the animal is stored within the storage device over a period of time. The information stored within the storage device is then retrieved after the period of time.

In one embodiment, the step of storing information relating to at least one detected parameter further includes storing information relating to the heart of the animal, storing information relating to the blood flow within the animal, storing information relating to a temperature of the animal, or storing information relating to a position of the animal in the storage device over a period of time. In another embodiment, the single unit can be implanted within the animal or secured to the animal with a collar device. In yet another embodiment, the information stored within the storage device is transferred to a microprocessor, such as in a receiver, for evaluation via a radio frequency link, a satellite link, or an electrical link.

Another apparatus for detecting and storing data relating to an animal includes a receiver associated with a global positioning system capable of detecting a location of the animal at an associated point in time and a storage component electrically coupled to the receiver for storing information regarding the location of the animal at the associated point in time. In differing embodiments, the apparatus may include a heart monitoring device, a blood flow monitoring device, or a temperature sensor electrically coupled to the storage component. The storage component would additionally store information relating to the parameter of the heart of the animal, the blood flow within the animal, or the temperature of the animal.

The present invention provides a device for and a method of detecting, generating, and storing information relating to an animal over a period of time. The device can be fixedly attached to an animal and then retrieved after a period of time. The device includes a storage component capable of storing a large amount of data about the animal. The data can be retrieved and analyzed such that a more complete understanding of the particular animal, including its migration habits and physical history, can be evaluated.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is a device capable of detecting, storing, and retrieving data and information relating to one or more parameters of an animal over a period of time. The device is capable of storing a large amount of information such that the migratory habits and physical attributes of an animal can be later retrieved and/or evaluated. The device may detect and store parameters of various animals, such as fish, birds, or any land-bound animal, such as deer, elk, bears, squirrels and the like.

Figure 1:
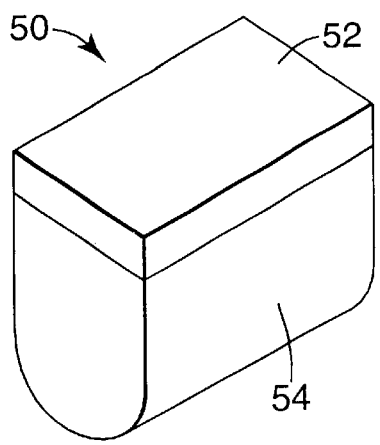
FIG. 1 is a perspective view of a monitoring device in accordance with the present invention.

FIG. 1 is a perspective view of monitoring device 50 in accordance with the present invention. Monitoring device 50 includes storage device 52 and detection component 54. As will later be described, storage device 52 may be an atomic resolution storage device capable of storing a large volume of data, such as megahertz to gigahertz of data points, within a relatively small storage area. In one embodiment, storage device 52 has a cross-sectional area in the range of approximately 0.25 square inches to 2.5 square inches. Storage device 52 may have a height in the range of approximately 0.010 inches to 1.00 inches. While storage device 52 is shown in FIG. 1 having a rectangular box configuration, it is understood by those in the art that storage device 52 may be formed in any configuration, such as a square, a rectangle, a circle, or any derivative thereof Similarly, detection component 54 and/or storage device 52 may be formed in any configuration without deviating from the present invention. It is only necessary that monitoring device 50 is sized such that it does not impede the normal movements of the animal to which it will be attached. Therefore, depending on the animal to which monitoring device 50 is to be attached, the size and configuration of monitoring device may vary.

As will later be described, detection component 54 may be capable of detecting one or more parameters of an animal to which monitoring device 50 is attached. For example, detection component 54 may be capable of detecting a location of the animal via a global positioning system. Detection component 54 may also be capable of detecting one or more physical attributes of an animal, such as heart rate, blood flow, or temperature.

Figure 3:
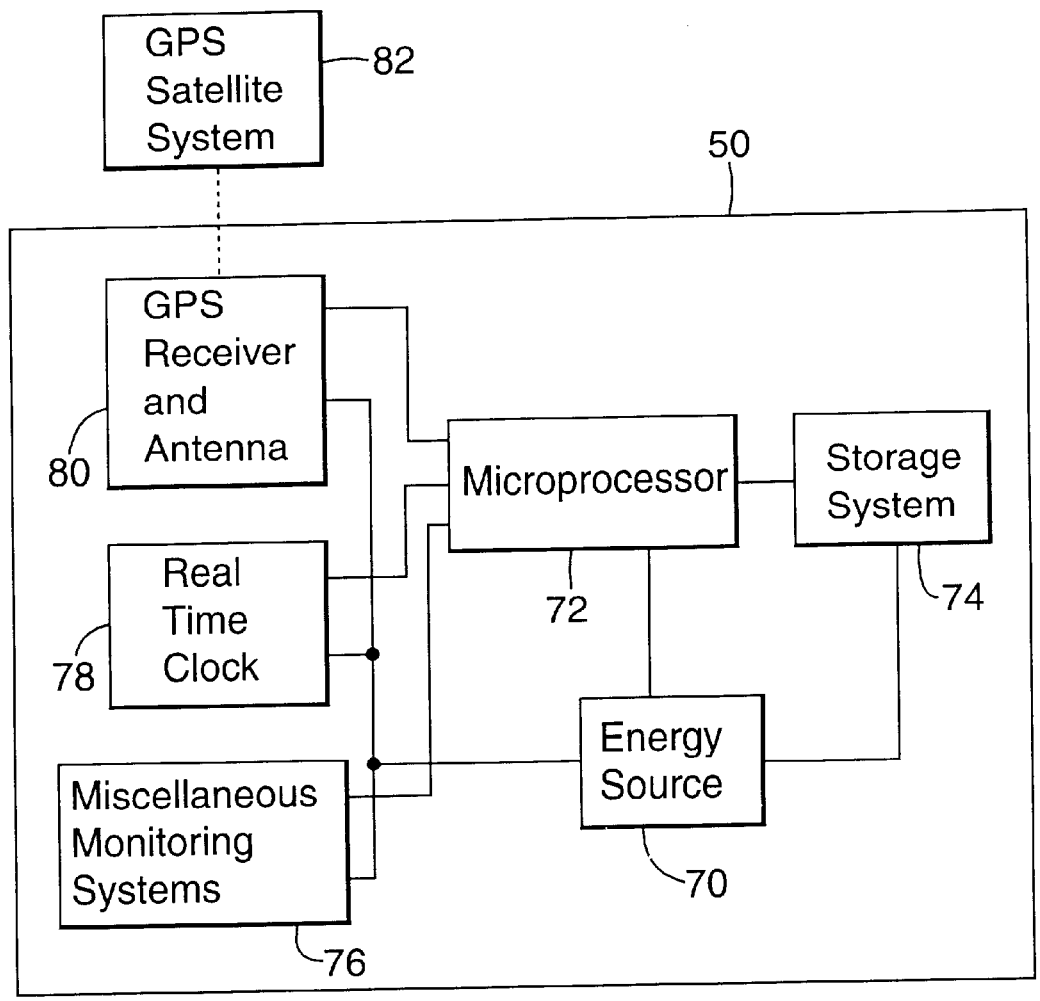
FIG. 3 is a block diagram illustrating the various components of a monitoring device in accordance with the present invention.

Detection component 54 is electrically coupled to storage device 52 such that the parameters of an animal detected by detection component 54 can be stored within storage device 52. With the addition of a clocking device, as shown in FIG. 3, information relating to various parameters of an animal at distinct times can be stored within storage device 52. For example, the physical location of an animal over an elongated time period can be stored within storage device 52. Likewise, physical attributes of an animal at specific times can be stored within storage device 52.

Figure 2:
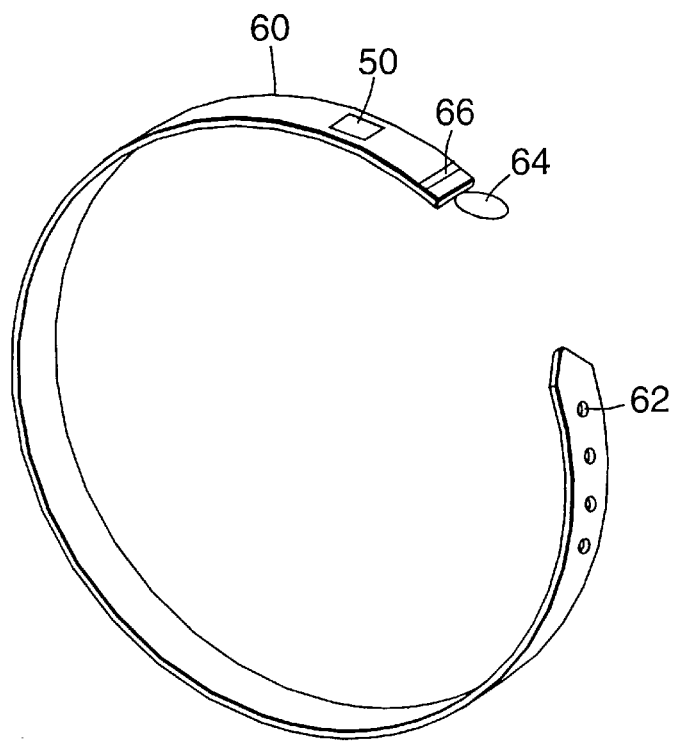
FIG. 2 is a perspective view of a collar device incorporating the present invention.

FIG. 2 is a perspective view of collar device 60 having monitor device 50 attached thereto. Collar device 60 is capable of being fixedly attached to an animal to be observed. In one embodiment, collar device 60 may be secured to an animal via any known fastening means, such as, for example, holes 62, pin 64, and strap 66. In another embodiment, collar 60 may be attached to an animal via a fastening means as known in the art such as a standard belt or pet collar. However, it is understood that other fastening means may be used without deviating from the present invention. For example, a harness type device may be used in place of collar 60. Collar 60 or a similar harnessing device may be fastened to an animal around the neck of the animal or to any other body part of the animal, such as a leg or a wing. Conversely, monitoring device 50 may be implanted into an animal to be monitored or may be fixedly attached to an animal by other known fastening means.

FIG. 3 is a block diagram illustrating the various components of monitoring device 50 in accordance with the present invention. Monitoring device 50 includes energy source 70, microprocessor 72, storage system 74, miscellaneous monitoring systems 76, real time clock 78, and global positioning system (GPS) receiver and antenna 80. Also shown in FIG. 3 is GPS satellite system 82.

Energy source 70 is shown electrically coupled to all other components of monitoring device 50, such as microprocessor 72, storage system 74, miscellaneous monitoring system 76, real time clock 78, and GPS receiver and antenna 80. Energy source 70 can be any type of energy source capable of providing energy to the other components of monitoring device 50. For example, in one embodiment, energy source 70 can be an electrochemical battery, commonly referred to as an electrochemical cell. Electrochemical cells typically include a case surrounding an anode, a separator, a cathode, and an electrolyte. The anode material is typically a lithium metal or, for rechargeable cells, a lithium ion containing body. For most high-energy applications, the cathode is a solid metal, such as silver vanadium oxide, and the electrolyte is a liquid, such as a lithium salt, in combination with an organic solvent. In addition, energy source 70 can be a number of other lithium-based cells.

In another embodiment, energy source 70 may be a thermal electric device. A thermal electric device operates based upon a thermal couple effect, which is the concept of utilizing a temperature differential to generate energy. More specifically, thermal electricity is a term that describes the electricity generated by applying heat to the junction of two different materials, such as metals or semiconductors. If two wires of different materials are joined at their ends, and one end is at a higher temperature differential than the other, a voltage differential will occur, and an electrical current is generated. Therefore, energy device 70 may be a thermal electric device capable of generating a voltage which can be used to power monitoring device 50 via a temperature differential between an animal body and its surroundings.

Microprocessor 72 can be any type of electronic component known in the art capable of manipulating or performing at least one function on received data. In one embodiment, microprocessor 72 includes an analog-to-digital component capable of generating a digital output signal based upon an analog input signal. Storage system 74 represents storage device 52, shown in FIG. 1, or a subcomponent of storage device 52. Miscellaneous monitoring system 76 can be one or more of a variety of monitoring systems. For example, miscellaneous monitoring systems 76 may include a heart monitoring device capable of monitoring a parameter of the heart. More specifically, miscellaneous monitoring systems 76 may include a heart monitoring device capable of monitoring a heart rate of an animal in proximity to the heart monitoring device. Heart monitoring devices of this type are known in the art. In another embodiment, miscellaneous monitoring systems 76 may include a blood flow monitoring device capable of monitoring blood flow within an animal. Blood flow monitoring devices of this type are known in the art. In yet another embodiment, miscellaneous monitoring system 76 may include a temperature sensor capable of sensing a body temperature of the animal. Temperature sensors of this type are known in the art.

Real time clock 78 can be any type of clocking or counting device known in the art. For example, in one embodiment, real time clock 78 may include a clock capable of maintaining the actual time and date. Real time clock 78 may also be connected to GPS receiver and antenna 80 via microprocessor 72 such that real time clock 78 maintains the proper time regardless of the time zone in which real time clock 78 is located. In another embodiment, real time clock 78 may include a simple counter, which would not maintain real time, but rather simply maintains a general time which can be manipulated by microprocessor 72 in order to maintain real time.

GPS receiver and antenna 80 and GPS satellite system 82 are known components and systems. GPS receiver and antenna 80 continuously receives and processes positioning information broadcasted by GPS satellites within GPS satellite system 82 in order to obtain a position of monitoring device 50. The positioning information can be stored directly in storage system 74 or can be manipulated by microprocessor 72 prior to being stored within storage system 74.

Figure 4:
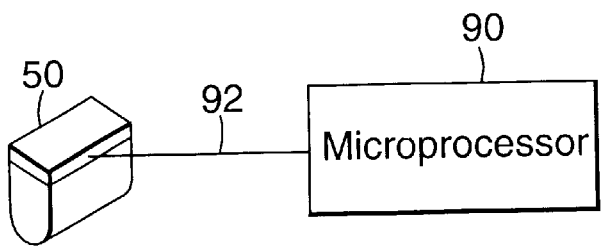
FIG. 4 is a simplified perspective view of a monitoring device electrically coupled to a microprocessor in accordance with the present invention.

FIG. 4 is a simplified perspective view of monitoring device 50 electrically coupled to microprocessor 90 in accordance with the present invention. In order to review and evaluate information stored within storage device 52 of monitoring device 50, information or data must be transferred or transmitted from monitoring device 50 to an external source, such as microprocessor 90. In one embodiment, once monitoring device 50 has been attached to an animal for a period of time, monitoring device 50 would be removed from the animal and electrical coupled with microprocessor 90. While monitoring device 50 is shown electrically coupled to microprocessor 90 via a physical or electrical connection or link, such as electrical link 92, it is understood in the art that monitoring device 50 can be electrically coupled to microprocessor 90 via other known means, such as via a radio frequency (RF) link or a satellite link. If a RF connection is utilized, monitoring device 50 includes a RF transmitter. In another embodiment, microprocessor 90 may be replaced by a simple display unit capable of displaying information or data compiled within microprocessor 72 of monitoring device 50. Thus, it is not critical that the device electrically coupled to monitoring device 50 to retrieve and review data and information from within monitoring device 50 is a microprocessor. Rather, it is only necessary that the device is capable of assisting an individual to review and/or evaluate the data or information within monitoring device 50.

FIGS. 5 through 8 disclose one embodiment of an atomic resolution storage device capable of storing megabytes to gigabytes of information in a small storage area. For a further discussion of an atomic resolution storage device, see U.S. Pat. No. 5,557,596, entitled, "Ultra-High Density Storage Device", by Gibson et al. and assigned to Hewlett-Packard Company, which is hereby incorporated by reference.

Figure 5:
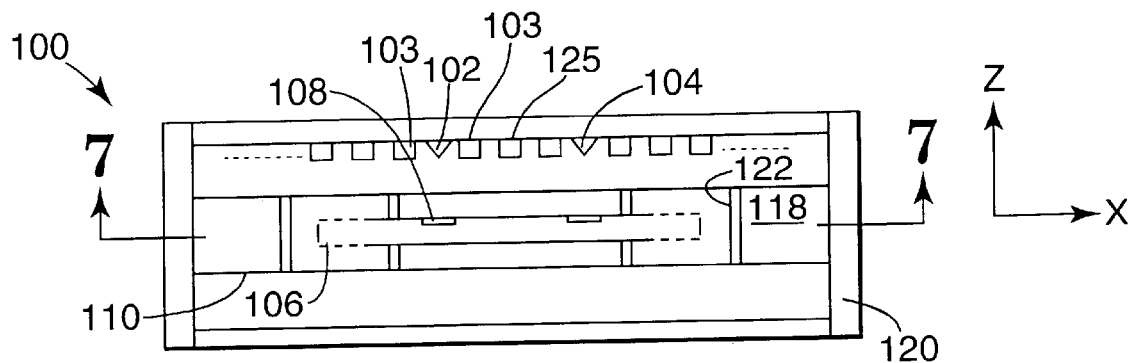
FIG. 5 illustrates a side view of a storage device in accordance with the present invention.

FIG. 5 illustrates a side cross-sectional view of storage device 100. Storage device 100 is one embodiment of storage device 52, shown in FIGS. 1–4. Storage device 100 includes a number of field emitters, such as field emitters 102 and 104, storage medium 106 including a number of storage areas, such as storage area 108, and micromover 110. Micromover 110 scans storage medium 106 with respect to the field emitters or vice versa. In one preferred embodiment, each storage area is responsible for storing one bit of information.

In one embodiment, the field emitters are point emitters having relatively very sharp points. Each point emitter may have a radius of curvature in the range of approximately 1 nanometer to hundreds of nanometers. During operation, a pre-selected potential difference is applied between a field emitter and its corresponding gate, such as between field emitter 102 and gate 103 surrounding it. Due to the sharp point of the emitter, an electron beam current is extracted from the emitter towards the storage area. Depending on the distance between the emitters and the storage medium 106, the type of emitters, and the spot size (bit size) required, electron optics may be utilized to focus the electron beams. A voltage may also be applied to the storage medium 106 to either accelerate or decelerate the field-emitted electrons or to aid in focusing the field-emitted electrons.

In one embodiment, casing 120 maintains storage medium 106 in a partial vacuum, such as at least $10^{-5}$ torr. It is known in the art to fabricate such types of microfabricated field emitters in vacuum cavities using semiconductor processing techniques.

In the embodiment shown in FIG. 5, each field emitter has a corresponding storage area. In another embodiment, each field emitter is responsible for a number of storage areas. As micromover 110 scans storage medium 106 to different locations, each emitter is positioned above different storage areas. With micromover 110, an array of field emitters can scan over storage medium 106.

As will be described, the field emitters are responsible to read and write information on the storage areas by means of the electron beams they produce. Thus, field emitters suitable for use in storage device 100 are the type that can produce electron beams that are narrow enough to achieve the desired bit density on the storage medium, and can provide the power density of the beam current needed for reading from and writing to the medium. A variety of ways are known in the art that are suitable to make such field emitters.

In one embodiment, there can be a two-dimensional array of emitters, such as 100 by 100 emitters, with an emitter pitch of 50 micrometers in both the X and the Y directions. Each emitter may access bits in tens of thousands to hundreds of millions of storage areas. For example, the emitters scan over the storage areas with a periodicity of about 1 to 100 nanometers between any two storage areas. Also, all of the emitters may be addressed simultaneously or in a multiplexed manner. Such a parallel accessing scheme significantly reduces access time, and increases data rate of the storage device.

Figure 6:
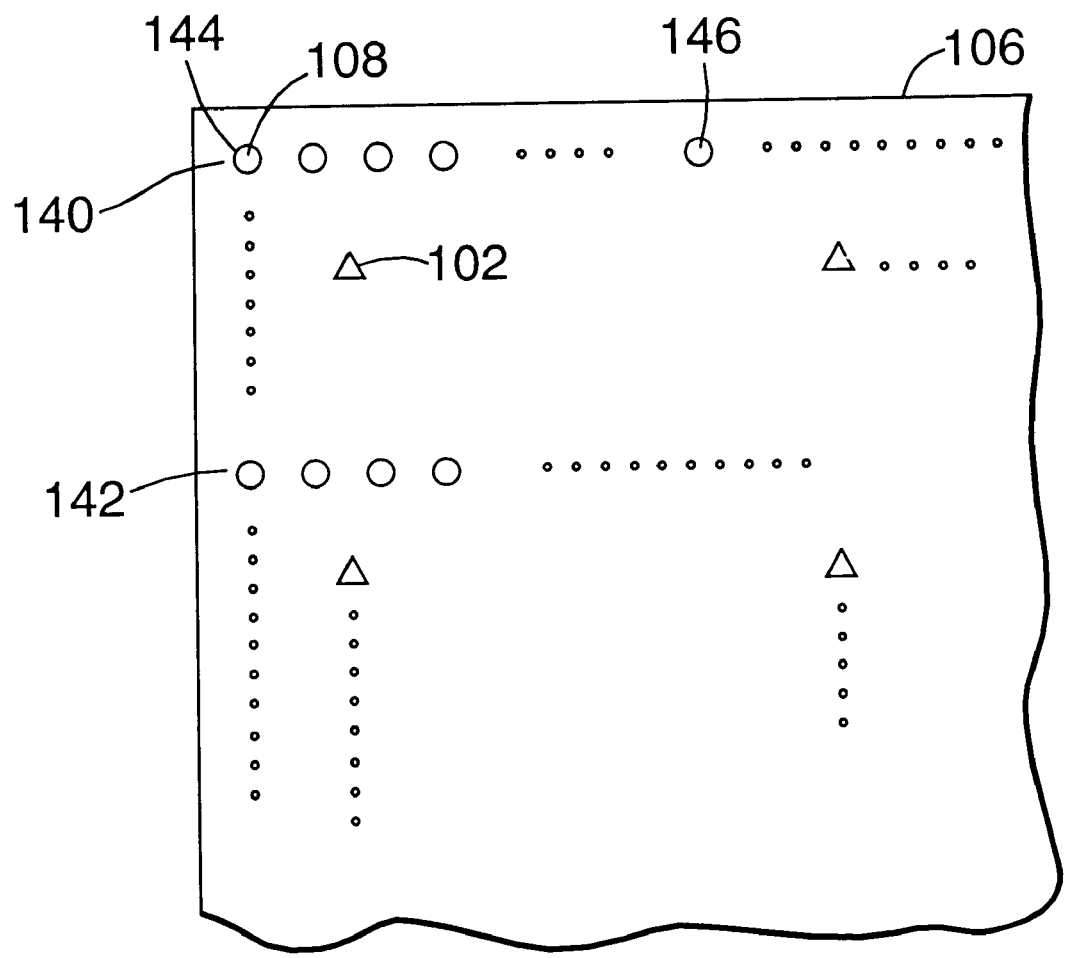
FIG. 6 is a simplified schematic diagram illustrating the storage device in accordance with the present invention.

FIG. 6 shows the top view of storage medium 100 having a two-dimensional array of storage areas and a two-dimensional array of emitters. Addressing the storage areas requires external circuits. One embodiment to reduce the number of external circuits is to separate the storage medium into rows, such as rows 140 and 142, where each row contains a number of storage areas. Each emitter is responsible for a number of rows. However, in this embodiment, each emitter is not responsible for the entire length of the rows. For example, emitter 102 is responsible for the storage areas within rows 140 through 142, and within columns 144 through 146. All rows of storage areas accessed by one emitter are connected to one external circuit. To address a storage area, one activates the emitter responsible for that storage area and moves that emitter by micromover 110 (shown in FIG. 5) to that storage area. The external circuit connected to the rows of storage areas within which that storage area lies is activated.

Micromover 110 can also be made in a variety of ways, as long as it has sufficient range and resolution to position the field emitters over the storage areas. As a conceptual example, micromover 110 is fabricated by standard semiconductor microfabrication process to scan storage medium 106 in the X and Y directions with respect to casing 120.

Figure 7:
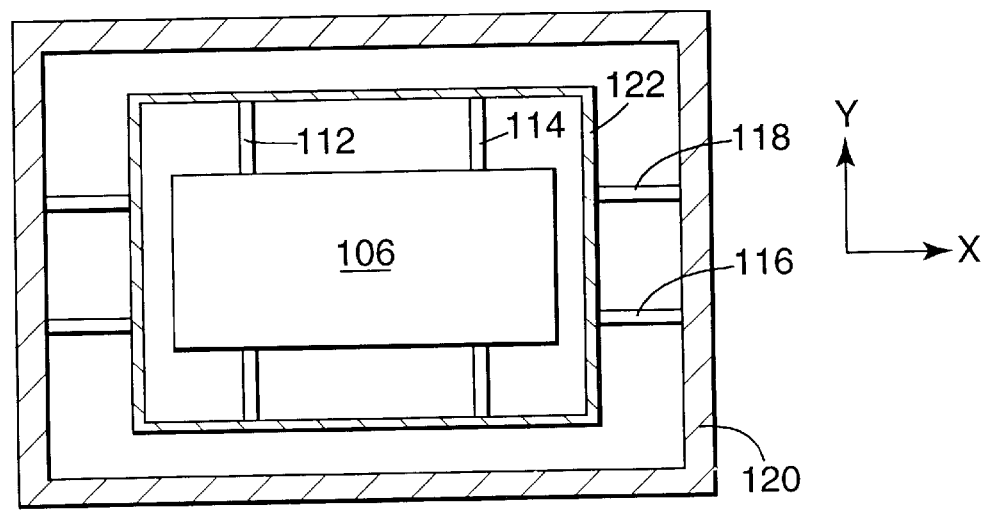
FIG. 7 is a top view of the storage device in accordance with the present invention as shown from lines A—A of FIG. 5.

FIG. 7 shows the top view of the cross section 7—7 in FIG. 5, illustrating storage medium 106 held by two sets of thin-walled microfabricated beams. The faces of the first set of thin-walled beams are in the Y-Z plane, such as 112 and 114. Thin-walled beams 112 and 114 may be flexed in the X direction allowing storage medium 106 to move in the X direction with respect to casing 120. The faces of the second set of thin-walled beams are in the X-Z plane, such as 116 and 118. Thin-walled beams 116 and 118 allow storage medium 106 to move in the Y direction with respect to casing 120. Storage medium 106 is held by the first set of beams, which are connected to frame 122. Frame 122 is held by the second set of beams, which are connected to casing 120. The field emitters scan over storage medium 106, or storage medium 106 scans over the field emitters in the X-Y directions by electrostatic, electromagnetic, piezoelectric, or other means known in the art. In this example, micromover 110 moves storage medium 106 relative to the field emitters.

In another embodiment, the electron beam currents are rastered over the surface of storage medium 106 by either electrostatically or electromagnetically deflecting them, such as by electrostatic deflectors or electrodes 125 (shown in FIG. 5) positioned adjacent to emitter 104. Many different approaches to deflect electron beams can be found in literature on Scanning Electron Microscopy and will not be further described in this specification.

In one method, writing is accomplished by temporarily increasing the power density of the electron beam current to modify the surface state of the storage area. Reading is accomplished by observing the effect of the storage area on the electron beams, or the effect of the electron beams on the storage area. For example, a storage area that has been modified can represent a bit 1, and a storage area that has not been modified can represent a bit 0, and vice versa. In fact, the storage area can be modified to different degrees to represent more than two bits. Some modifications may be permanent, and some modifications may be reversible. The permanently modified storage medium is suitable for write-once-read-many memory (WORM).

In one embodiment, the basic idea is to alter the structure of the storage area in such a way as to vary its secondary electron emission coefficient (SEEC), its back-scattered electron coefficient (BEC), or the collection efficiency for secondary or back-scattered electrons emanating from the storage area. The SEEC is defined as the number of secondary electrons generated from the medium for each electron incident onto the surface of the medium. The BEC is defined as the fraction of the incident electrons that are scattered back from the medium. The collection efficiency for secondary/back-scattered electrons is the fraction of the secondary/back-scattered electrons that is collected by an electron collector, typically registered in the form of a current.

Reading is typically accomplished by collecting the secondary and/or back-scattered electrons when an electron beam with a lower power density is applied to storage medium 106. During reading, the power density of the electron beam should be kept low enough so that no further writing occurs.

One embodiment of storage medium 106 includes a material whose structural state can be changed from crystalline to amorphous by electron beams. The amorphous state has a different SEEC and BEC than the crystalline state, which leads to a different number of secondary and back-scattered electrons emitted from the storage area. By measuring the number of secondary and back-scattered electrons, one can determine the stage of the storage area. To change from the amorphous to crystalline state, one increases the beam power density and then slowly decreases it. This heats up the amorphous and then slowly cools it so that the area has time to anneal into its crystalline state. To change from crystalline to amorphous state, one increases the beam power density to a high level and then rapidly decreases the beam power. To read from the storage medium, a lower-energy beam strikes the storage area. An example of such type of material is germanium telluride (GeTe) and ternary alloys based on GeTe.

There are many preferred ways to induce a state change in storage medium 106. For example, a change in the topography of the medium, such as a hole or bump, will modify the SEEC and BEC of the storage medium. This modification occurs because the coefficients typically depend on the incident angle of the electron beam onto the storage area. Changes in material properties, band structure, and crystallography may also affect the coefficients. Also, the BEC depends on an atomic number, Z. Thus, one preferred storage medium has a layer of low Z material on top of a layer of high Z material or vice versa, with writing accomplished through ablating some of the top layer by an electron beam.

Figure 8:
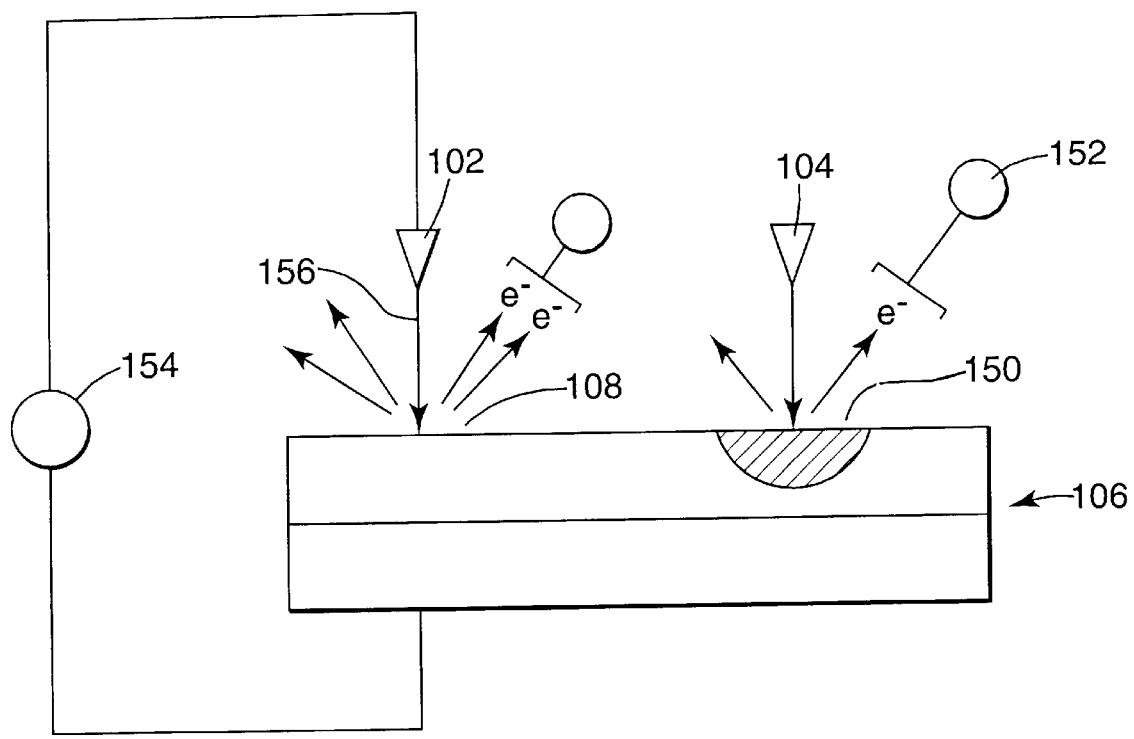
FIG. 8 is a diagram illustrating field emitters reading from storage areas of the storage device in accordance with the present invention.

FIG. 8 shows schematically the field emitters reading from storage medium 106. The state of storage area 150 has been altered, while the state of storage area 108 has not been altered. When electrons bombard a storage area, both secondary electrons and back-scattered electrons will be collected by the electron collectors, such as electron collector 152. An area that has been modified will produce a different number of secondary electrons and back-scattered electrons, as compared to an area that has not been modified. The difference may be more or may be less depending on the type of material and the type of modification. By monitoring the magnitude of the signal current collected by electron collectors 152, one can identify the state of and, in turn, the bit stored in, the storage area.

Field emitters may be noisy with the magnitude of the electron beam current varying with respect to time. Moreover, the gap distance between the tips of the emitters and the surface of the storage medium may vary. If the information stored were based on tunneling current, then the gap distance may be extremely crucial. However, the application presently disclosed depends on field emitters, and not directly on the emitted electron beam current, but rather on the effect of the beam. At least two ways may be used to alleviate the problem of the emitters being noisy. One way is to connect constant current source 154 to field emitter 102. This source will control the power density of electron beam current beam 156. Although this method will not storage techniques using the magnitude of the field emitted current as the signal, this method reduces the field emitter noise significantly. Another way to alleviate the field-emitter noise is to separately measure the emitted electron beam current and use it to normalize the signal current. As the electron beam current varies, the signal current varies correspondingly. On the other hand, the normalized signal current remains the same to indicate the state of the storage area.

Figure 9:
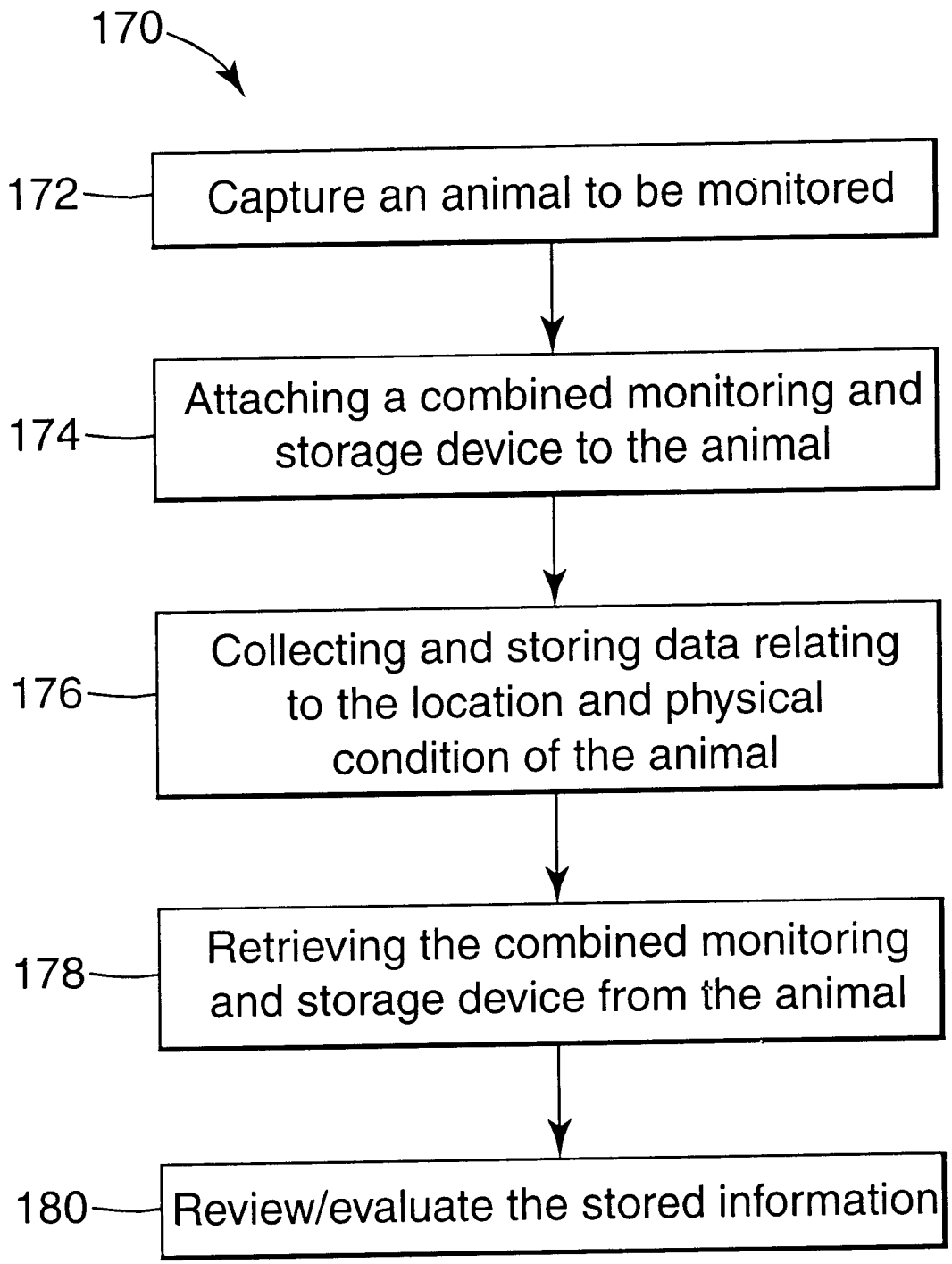
FIG. 9 is a flow chart illustrating a method of collecting data relating to an animal in accordance with the present invention.

FIG. 9 is a flow chart illustrating method 170 of collecting data relating to an animal in accordance with the present invention. At step 172, an animal to be monitored is captured. At step 174, a combined monitoring and storage device, such as monitoring device 50, is attached to the animal. As previously discussed, monitoring device 50 can be attached to an animal in a variety of ways, such as to a limb or a wing of an animal via a collar or a harness apparatus or by other known fastening means. Monitoring device 50 may also be implanted into the animal.

At step 176, data relating to the location and/or physical condition of the animal is collected and stored within monitoring device 50. As previously discussed, the time frame over which monitoring device 50 may collect and store data may vary depending upon the particular application. For example, it may be desirous to retrieve the collected and stored information after only a few hours or a few days. Conversely, the data collected and stored may be retrieved only after several months or years.

At step 178, the combined monitoring and storage device is retrieved from the animal. This can be done by simply removing monitoring device 50 from the animal if an external attachment is used, or by physically removing monitoring device 50 from within the animal via known surgical procedures. At step 180, the stored information can be reviewed and evaluated in order to better understand the migratory habits and/or the physical conditions of an animal over a specified period of time.

In conclusion, the present invention is a device capable of detecting, generating, and storing a large volume of data or information (megabytes to gigabytes range) relating to one or more parameters of an animal over a period of time. The device is capable of storing information or data such that the migratory habits and physical attributes of an animal can be later retrieved and/or evaluated. The device of the present invention may detect and store parameters of various animals, such as fish, birds, or any land bound animal. The device may detect and store the position of the animal over a significant time period, or may detect and store conditions of the animal relating to heart beat, blood flow, temperature, or other similar attributes.

Although, specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus for detecting and storing data relating to an animal, the apparatus comprising:

at least one detection component capable of detecting information regarding at least one parameter of the animal; and an atomic resolution storage device electrically coupled to the at least one detection component for storing the information regarding the at least one parameter.

2. The apparatus of claim 1, wherein the detection component further comprises:

a clocking device electrically coupled to the storage device.

3. The apparatus of claim 2, wherein the detection component further comprises:

a receiver associated with a global positioning system electrically coupled to the storage device; and wherein the storage device stores information relating to a location of the animal at distinct times.

4. The apparatus of claim 2, wherein the detection component further comprises:

a heart monitoring device electrically coupled to the storage device, the heart monitoring device capable of monitoring a parameter of the heart; and wherein the storage device stores information relating to the parameter of heart at distinct times.

5. The apparatus of claim 2, wherein the detection component further comprises:

a blood flow monitoring device electrically coupled to the storage device, the blood flow monitoring device capable of monitoring the blood flow within the animal; and wherein the storage device stores the information relating to the blood flow of the animal at distinct times.

6. The apparatus of claim 2, wherein the detection component further comprises:

a temperature sensor electrically coupled to the storage device, the temperature sensor capable of sensing a temperature of the animal; and wherein the storage device stores information relating to the temperature of the animal at distinct times.

7. The apparatus of claim 1, and further comprising:

an energy source capable of providing energy to the at least one detection component and to the storage device.

8. The apparatus of claim 1, and further comprising:

a microprocessor electrically coupled to the at least one storage component at to the storage device, the microprocessor capable of manipulating the information regarding the at least one parameter and providing data to the storage device based upon the manipulated information.

9. The apparatus of claim 1, wherein the atomic resolution storage device further comprises:

a field emitter fabricated by semiconductor microfabrication techniques capable of generating an electron beam current; and a storage medium in proximity to the field emitter and having a storage area in one of a plurality of states to represent the information stored in the storage area.

10. The apparatus of claim 9, wherein an effect is generated when the electron beam current bombards the storage area, wherein the magnitude of the effect depends upon the state of the storage area, and wherein the information stored in a storage area is read by measuring the magnitude of the effect.

11. A method of monitoring information relating to parameters of an animal, the method comprising:

electrically coupling an atomic resolution storage device to a detecting device within a single unit;

attaching the single unit to an animal;

storing information relating to at least one detected parameter in the storage device over a period of time; and retrieving the information stored within the storage device after the period of time.

12. The method of claim 11, wherein the step of storing information relating to at least one monitored parameter further comprises:

storing information relating to a heart of the animal in the storage device over a period of time.

13. The method of claim 11, wherein the step of storing information relating to at least one monitored parameter further comprises:

storing information relating to blood flow of the animal in the storage device over a period of time.

14. The method of claim 11, wherein the step of storing information relating to at least one monitored parameter further comprises:

storing information relating to a temperature of the animal in the storage device over a period of time.

15. The method of claim 11, wherein the step of storing at least one monitored parameter further comprises:

storing information relating to a position of the animal in the storage device over a period of time.

16. The method of claim 11, wherein the step of attaching the single unit to an animal further comprises:

implanting the single unit within the animal.

17. The method of claim 11, wherein the step of attaching the single unit to an animal further comprises:

securing the single unit to a collar device, which is secured to the animal.

18. The method of claim 11, wherein the step of retrieving information stored within the storage device further comprises:

transferring the information stored within the storage device to a microprocessor via a radio frequency link.

19. The method of claim 11, wherein the step of retrieving information stored within the storage device further comprises:

transferring the information stored within the storage device to a microprocessor via a satellite link.

20. The method of claim 11, wherein the step of retrieving information stored within the storage device further comprises:

transferring the information stored within the storage device to a microprocessor via an electrical link.

21. An apparatus for detecting and storing data relating to an animal, the apparatus comprising:

a receiver associated with a global positioning system capable of detecting a location of the animal at an associated point in time; and a storage component electrically coupled to the receiver for storing information regarding the location of the animal at the associated point in time, wherein the storage component further includes an atomic resolution storage device.

22. The apparatus of claim 21, and further comprising:

a heart monitoring device electrically coupled to the storage component, the heart monitoring device capable of monitoring a parameter of the heart; and wherein the storage component stores information relating to the parameter of the heart at distinct times.

23. The apparatus of claim 21, and further comprising:

a blood flow monitoring device electrically coupled to the storage component, the blood flow monitoring device capable of monitoring the blood flow within the animal; and wherein the storage component stores the information relating to the blood flow of the animal at distinct times.

24. The apparatus of claim 21, and further comprising:

a temperature sensor electrically coupled to the storage component, the temperature sensor capable of sensing a temperature of the animal; and wherein the storage component stores information relating to the temperature of the animal at distinct times.

25. The apparatus of claim 21, and further comprising:

an energy source capable of providing energy to the receiver and to the storage component.

26. The apparatus of claim 21, and further comprising:

a microprocessor electrically coupled to the receiver and to the storage component, the microprocessor capable of manipulating the information regarding the receiver and providing data to the storage component based upon the manipulated information.

* * * * *